INVENTOR.
WALLACE R. SENECHAL
BY
C. H. Miranda
ATTORNEY

United States Patent Office 3,085,840
Patented Apr. 16, 1963

3,085,840
TRANSPARENT CLOSURE
Wallace R. Senechal, North Tonawanda, N.Y., assignor to Sperry Rand Corporation, New York, N.Y., a corporation of Delaware
Filed Nov. 8, 1961, Ser. No. 151,028
8 Claims. (Cl. 312—138)

The invention relates to transparent closures and more particularly to window units which permit viewing of the interior of equipment but provide for limited physical access by authorized personnel only to said interior.

One of the many kinds of equipment in which this type of closure finds use is limited access visible records equipment, wherein records, mounted on pivotal frames behind a transparent window, are manipulated from outside said window to allow the user to read the records but prevents unauthorized access to the records.

An object of this invention is to provide a novel transparent closure for limited access equipment.

Another object is to provide a transparent closure which is mounted on the equipment for displacement away from an access opening to permit unencumbered access to the interior of the equipment.

A further object is to provide a transparent closure which is securely carried by its mounting structure and which is properly counterbalanced in each of many different open positions.

The present invention contemplates a novel closure which includes a frame on the equipment surrounding an access opening through which the interior of the equipment is to be viewed. Bracket members are provided on the frames and carry channel members thereon. The bracket members are pivotally mounted on the frame so as to pivot the channel members from a position in a plane defined by the frame to a position in a plane inclined to the plane of the frame. Extension members are carried by the channel members for sliding movement therein. A transparent closure member is carried by the extension members for sliding movement. The bracket members, channel members, extension members, and transparent closure are all interconnected to form a closure unit. The entire unit is first pivoted so that the closure moves from the plane of the frame to the inclined plane, then the transparent closure member is moved to its open position. The transparent closure in its open position is completely removed from the vicinity of the opening thus allowing complete physical access to the interior of the equipment. Furthermore, when the closure is in its open position the extension members, and channel members still provide a secure support structure therefor.

Other objects and advantages of the invention, in its details of construction and arrangement of parts, will be apparent from a consideration of the following specification and accompanying drawings wherein:

FIG. 4 is an elevational view, in section, of one side of the closure mounting structure;

Figure 1:
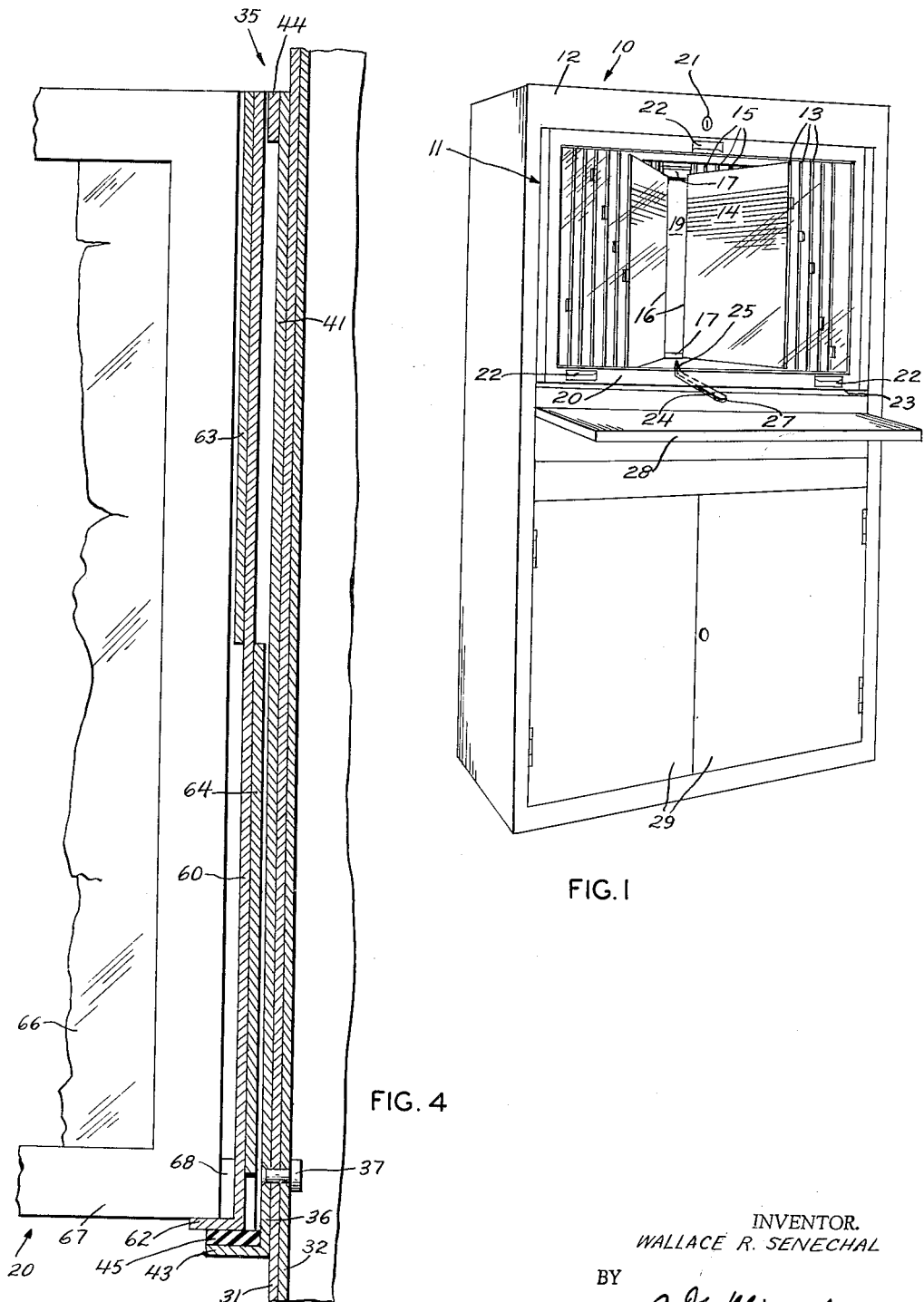
FIG. 1 is a perspective view of a limited access visible records cabinet utilizing the present invention.

Referring to the drawings, for a detailed description of the present invention an embodiment thereof is incorporated in a limited access visible record cabinet indicated generally at 10. Cabinet 10 is enclosed on all sides and is provided with an access opening 11, in the upper part of the front wall 12, to provide access to the interior of the cabinet 10. The interior of the cabinet accommodates record frames 13 which in turn accommodate cards 14 bearing recorded information. The record frames 13 are provided with pivot pins 15 at the upper and lower ends of their back edges 16. The pivot pins 15 are inserted in sockets (not shown) carried by cross bars 17 installed on the rear wall 19 of the record cabinet 10. The sockets are spaced along the cross bars 17 so that the record frames 13 may be pivoted to a position wherein the cards 14 are visible to the user.

In order to preserve the records, the user must be denied physical access to the record frames 13 and cards 14. However, the record frames 13 must be physically accessible to authorized personnel for various reasons, such as the updating of the recorded information or removal of the record frames 13 to photographically copy the recorded information. This type of limited access is effected by providing the cabinet 10 with a movable or displaceable transparent closure 20, accommodated within the access opening 11 in the front wall 12. Unauthorized persons are prevented from removing or displacing the transparent closure 20 by a lock 21 provided in the front wall 12 of the record cabinet 10. Lock 21 is of any conventional structure such as the type wherein a sliding bolt is moved, by a turn of a key, into a slot in the member to be locked. Unlocking is accomplished by turning the key in the reverse direction and thus removing the bolt from the slot. The transparent closure 20 is further provided with handles 22.

In the use of the cabinet 10, the user must be able to manipulate the record frames 13 in order to view the cards 14 on any or all of the frames without permitting manual access to the cards. To this end, a slot 23 is provided in the front wall 12 of cabinet 10, just below the transparent closure 20. This slot 23 accommodates entry of a manually operable selector 24 having a finger 25 adapted for insertion between the frames to pivot same about pins 15 in the nature of turning the pages in a book. Selector 24 is mounted for longitudinal movement and for pivoting about an axis transversely thereto whereby movement upwardly of an end 27 pivots end 25 below the lower edge of frames 13. Thereafter selector 24 is moved longitudinally to position finger 25 at the appropriate place and end 27 of selector 24 is lowered raising the finger 25 between the record frames. With the finger 25 positioned between the record frames 13, the selector 24 is moved in slot 23 in a direction to separate the record frames 13. Because of the pivotal mounting of the record frames 13, they will pivot under action of the selector 24 until gravity causes them to drop to an open position.

The structure providing for the movement of selector 24 is not believed necessary to an understanding of the present invention and therefore it is not necessary to describe same here.

The record cabinet 10 may be provided with a shelf 28 to write on while viewing the records. Doors 29 may also be provided in the lower section of the record cabinet 10 and the space therein used for storage.

Access opening 11 in the front wall 12 of cabinet 10 is of rectangular configuration. For purposes of clarity, only two side frame members 31, 32 (FIGS. 2 and 4) and one bottom frame member 33 are shown. However, there are top frame members (not shown) and frame members (not shown) on the side opposite frame members 31, 32. All of these frame members are secured together by suitable means such as welding, riveting, etc., to form the rectangular access opening 11.

Figure 2:
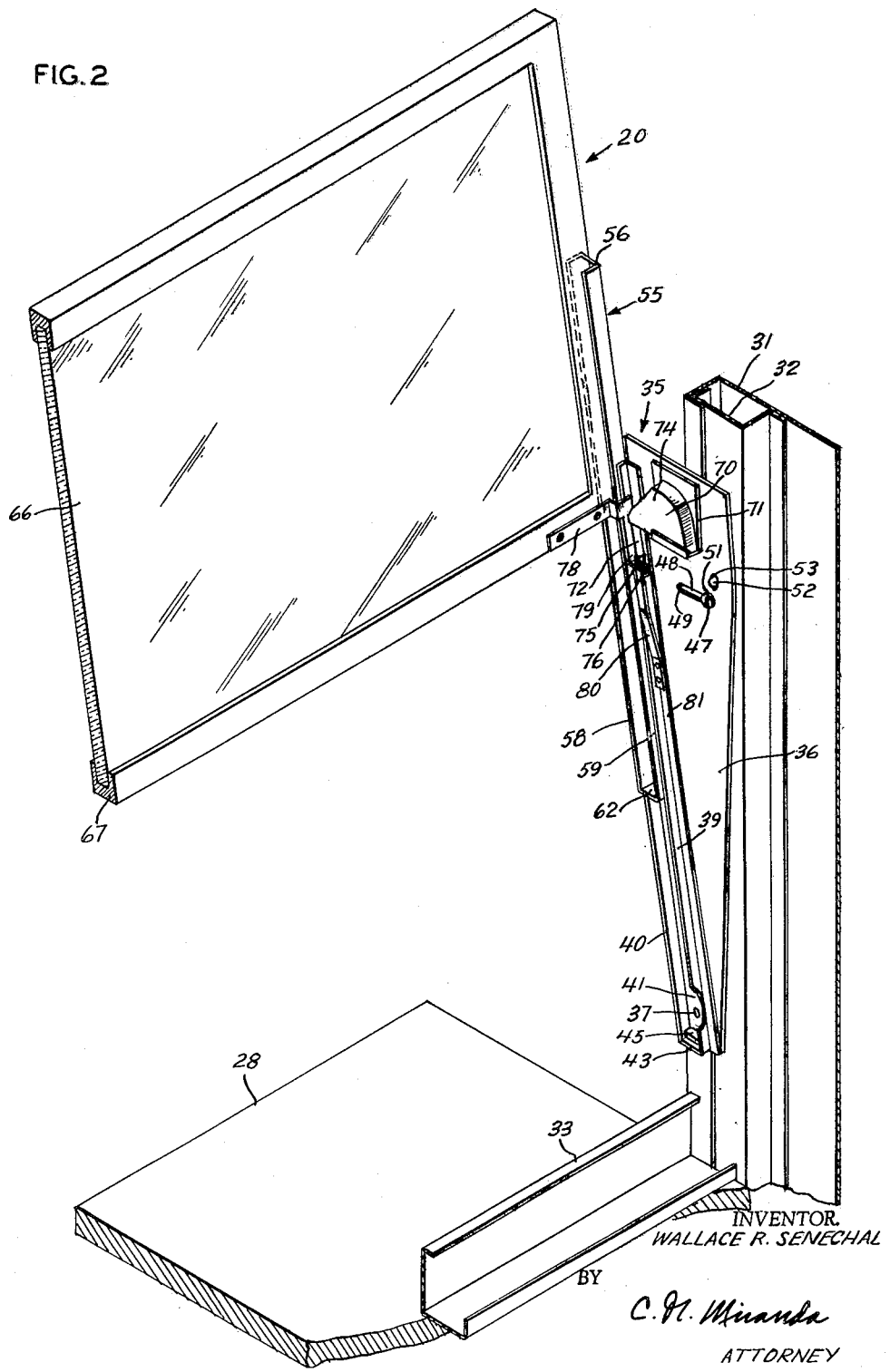
FIG. 2 is a perspective view of the closure unit, from inside the cabinet, looking out, showing the mounting structure.

FIGURE 2 shows the transparent closure 20 and the mounting structure, generally indicated at 35, for one side thereof. The mounting structure for the other side of the transparent closure 20 has not been shown since it is merely a mirror image of that shown at 35.

Figure 3:
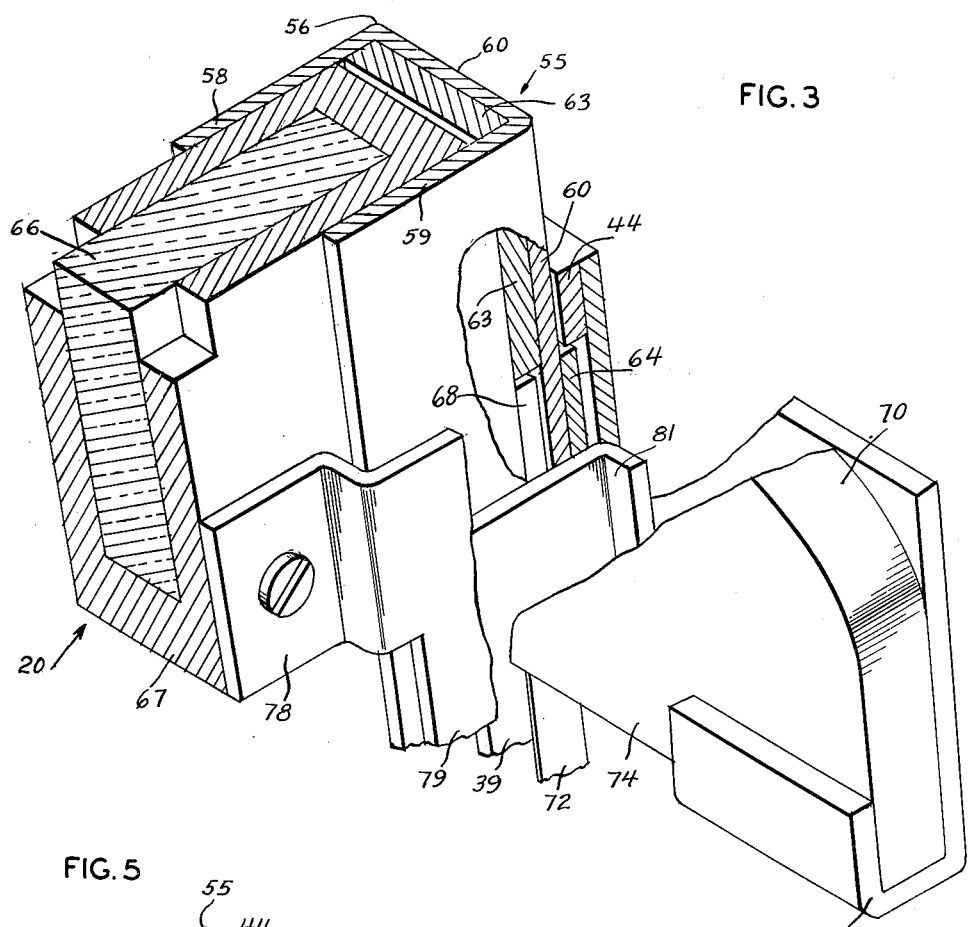
FIG. 3 is a perspective view of a portion of the structure of FIG. 2 on a larger scale, cut away to show various abutment members.

The mounting structure 35 comprises a bracket member 36 pivoted to side frame members 31, 32 on a pivot member 37. Guide channel members 39, 40 are secured to bracket member 36 by suitable means such as welding. These guide channel members 39, 40 define a channel having a bottom 41 and end members 43, 44 (FIG. 3). End member 43 is provided with a pad 45 of a resilient material such as rubber or the like. End member 43 functions as an abutment or stop in a manner to be hereinafter described.

A limit piece such as a threaded member 47, projects through a slot 48, in bracket member 36, and is secured to side frame member 32. The limit piece 47 is mounted on side frame 32 so that there is sufficient clearance between its head and side frame 32 to allow bracket member 36 to pivot freely. The front end 49 of slot 48 coacts with limit piece 47 to define an inner limit of travel for bracket member 35 as it pivots around pivot 37. In this inner position the guide channels 39, 40 of bracket member 36 are in vertical position and are in a reference plane defined by the frame members 31, 32 and 33. The back end 51 of slot 48, which is shown in abutting relation with limit piece 47 in FIG. 2, coacts with said limit piece 47 to define an outer limit of travel for bracket member 36 as it pivots around its pivot 37. In this outer position the guide channels 39, 40 of bracket member 36 assume a position in a second plane inclined to the aforementioned reference plane. A bullet catch 52 is mounted on side frame member 32 and is biased by a spring (not shown) to project through an aperture 53 in the bracket member 36. The bullet catch 52 and aperture 53 provide a means for releasably securing bracket member 36 in its outer position. When the bracket member 36 is pivoted to its outer position, as shown in FIG. 2, the aperture 53 registers with the bullet catch 52 and the spring (not shown) moves the bullet catch 52 into the aperture 53. With the bullet catch 52 thus positioned, unwarranted pivoting of bracket member 36 to its inner position will be hindered. If it is desired to pivot bracket member 35 to its inner position the application of a predetermined amount of pressure on the bracket member 36 will cause the spring to yield and the bullet catch 52 to recede from aperture 53 into the side frame 32 allowing the bracket member 36 to pivot inwardly.

An extension member 55 (FIGS. 2 and 3) is carried between guide channels 39, 40 for sliding movement therebetween. The extension member comprises a U shaped member 56 having two sides 58, 59 and a bottom 60. The lower end of the extension terminates in an end member 62 which serves as an abutment or stop, the function of which will be hereinafter described. Inner strip member 63 and outer strip member 64 (FIG. 4) are secured to the upper inner and lower outer portion respectively of the bottom 60 of the extension member 55. These strip members also serve as abutment or stop members in a manner to be hereinafter described.

Transparent closure 20 is carried by the extension member 55 for sliding movement therein. The closure member 20 consists of a transparent member 66 which may be glass, Plexiglas or other transparent material. Transparent member 66 is enclosed by a rectangular frame 67 having stop members 68 (FIG. 3) protruding from the lower side portions thereof. The stop member 68 and the rectangular frame 67 are positioned for sliding movement between the sides 58, 59 of the U shaped extension member 55.

A spring type counterbalance 70 is mounted on a bracket 71 on bracket member 36. The counterbalance is of the conventional clockspring type with spring biased tape end 72 protruding from the case 74. A hook 75, carried by the spring tape 72, is mounted over a stud 76 on a depending leg 79 of a member 78 carried by the transparent closure 20. Movement of the transparent closure 20, from the raised position of FIG. 2 to the lowered position of FIG. 4 withdraws the tape 72 from the case 74 and in doing so tightens the clockspring (not shown). As the clockspring tightens, it exerts a counter force sufficient to counterbalance the weight of the transparent closure 20.

The depending leg 79 of member 78, carried by the transparent closure 20, coacts with a spring member 80 secured to a leg 81 of channel member 39 carried by bracket member 36. When the window is in its raised position as shown in FIG. 2 the spring member 80 springs out under leg 79 of member 78 to latch the transparent closure in its raised position.

Figure 5:
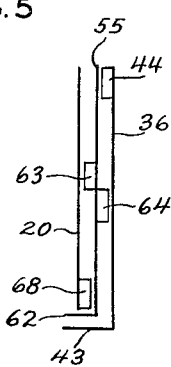
FIG. 5 is a schematic representation of one side of the closure mounting structure with the closure in its lowered condition.
Figure 6:
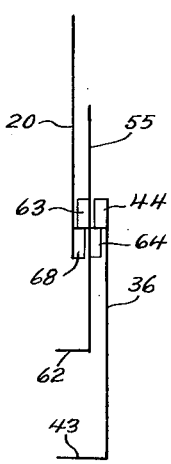
FIG. 6 is a schematic representation, similar to FIG. 5 of the closure mounting structure with the closure in its elevated or open condition.

When authorized personnel desire manual acess to the record frames 13, the lock 21 is actuated to an unlocked position. The handle 22, at the top of the window, is pulled outwardly thereby pivoting the transparent closure 20, extension member 55, and bracket member 36 about pivot 37. When the bracket member 36 has been pivoted to its outer limit the bullet catch 52 will, under action of its spring (not shown) be moved into aperture 53. The handles 22, on the lower end of the transparent closure 20, are then grasped and the transparent closure 20 is raised to the position shown in FIGS. 2 and 3. To more clearly show the interaction between the transparent closure 20, extension member 55 and bracket member 36, reference is specifically made to the schematic representations in FIGS. 5 and 6. The elements in FIGS. 5 and 6 are numbered to correspond to the structure, which they represent as shown in FIGS. 3 and 4 respectively. As the transparent closure 20 is raised from the position shown in FIG. 5 the transparent closure 20 will move with respect to both extension member 55 and bracket member 36. After a first, predetermined distance stop member 68 will abut against inner strip member 63. From this point on both the transparent closure 20 and extension member 55 will travel together with respect to bracket member 36. After sliding a predetermined second distance outer strip member 64 will abut against channel end stop 44 on bracket member 36. As the transparent closure approaches this latter condition the depending leg 79 of latch member 78 slides over spring member 80 depressing same. When the window reaches its maximum raised condition (stops 64 and 44 abutting) the leg 79 has passed over spring member 80 allowing same to spring out under leg 79 and prevent the transparent closure from being lowered. With the transparent closure in its maximum raised condition, it is completely away from the front of access opening 11 in the front wall 12 of the record cabinet 10. This allows unobstructed access to the record frames 13 and the cards 14 thereon. The bracket member 36, extension member 55 and frame member 67 of the transparent closure 20 form a sturdy structure securely positioning the raised closure. Outer strip member 64 (FIG. 3) extends beyond side 60 of extension member 55 and is engaged by a lip (not shown) on the upper inner portion of guide channel member 40 to prevent movement of the lower portion of extension member 55 from between guide channels 39 and 40 when the window is in its raised position as shown in FIG. 2.

When it is desired to close the transparent closure 20, the spring member 80 is pressed against the bracket member 36 and the transparent closure 20 lowered. At first, the transparent closure 20 will slide with respect to both the extension member 55 and bracket member 36. After travelling a predetermined distance stops 68 on the transparent closure frame 67 will abut against end member 62 of extension member 55. From this point both the transparent closure 20 and extension member 55 will slide with respect to bracket member 36 until stop member 62 abuts against stop pad 45 on channel end 43. The transparent closure is then pressed towards the front of the record cabinet 10 which pressure causes the bullet catch 52 to recede against its spring and out of aperture 53. When the bullet catch 52 has fully withdrawn from the aperture the bracket member 36 will, with continued inward pressure thereon, pivot around its pivot 37 and into the access opening 11 in the front wall 12 of the record cabinet 10. The pivoting movement of bracket 36 will be arrested when limit piece 47 engages the front end of slot 48. At this point the lock 21 may be turned to its locked condition.

It is understood that although I have shown the preferred form of my invention, that various modifications may be made in the details thereof without departing from its spirit as comprehended by the following claims.

What is claimed is:

1. A closure of the class described, comprising:
 (a) frame means defining a reference plane,
 (b) guide means carried by said frame means for movement from a position in said reference plane to a position in a second plane,
 (c) extension means carried by said guide means,
 (d) a transparent window carried by said extension means,
 (e) means interconnecting said transparent window, extension means, and guide means to provide for relative sliding movement between said transparent window and extension means for a predetermined distance within said second plane,
 (f) said interconnecting means further permitting concurrent sliding movement of said transparent window and said extension means within said second plane, subsequent to the movement of said transparent window through said predetermined distance, and
 (g) means disposed in the path of movement of said extension means for limiting movement of said extension means, and thereby said window beyond a predetermined second distance.

2. The closure of claim 1, wherein
 (a) said frame means comprises four spaced frame members interconnected to form a rectangular frame,
 (b) said rectangular frame surrounding said transparent window, extension means and guide means when said transparent window extension means and guide means lie in the reference plane,
 (c) one of said frame members preventing the sliding movement of both the extension means and the transparent window when the guide means are positioned in said reference plane,
 (d) said extension means and transparent window being free for sliding movement when the guide means is positioned in the second plane.

3. The closure of claim 2, wherein
 (a) said guide means comprises a bracket pivotally mounted on the frame means for movement from the reference plane to the second plane, and
 (b) spring biased catch means mounted on said frame means and cooperating with said bracket when said bracket is positioned in said second plane to prevent movement of said bracket from said position in said second plane.

4. The closure of claim 3, wherein
 (a) counterbalance means are provided on the bracket,
 (b) securing means are provided interconnecting said counterbalance means and the transparent window,
 (c) said counterbalance means maintaining said transparent window at any position of its sliding movement within the second plane,
 (d) latch means, cooperating with said transparent window and bracket to positively secure said transparent window subsequent to sliding movement through said predetermined second distance.

5. The closure of claim 4, the combination including
 (a) lock means coacting with the transparent window and the frame means when said transparent window lies in the reference plane,
 (b) said lock means having a locked and unlocked condition,
 (c) said lock means in the locked condition thereof preventing movement of said transparent window from said reference plane.

6. A vertical window unit of the class described adapted to close an access opening, said vertical window unit comprising
 (a) frame means of rectangular configuration surrounding said access opening;
 (b) said frame means having spaced upper and lower horizontal frame members and spaced vertical frame members interconnected to form the rectangular configuration;
 (c) bracket means pivotally mounted on said spaced vertical frame members;
 (d) channel means mounted on said bracket means for pivotal movement therewith from a position within said opening to a position inclined to said opening,
 (e) extension means carried by said channel means for sliding movement therein,
 (f) transparent window means carried by said extension means for sliding movement therein,
 (g) said upper frame member preventing sliding movement of said transparent window means and said extension means when said channel means is positioned within said opening,
 (h) lock means carried by said upper frame member and transparent window means and adapted to prevent pivotal movement of channel means, extension means, and said transparent window means,
 (i) said channel means when pivoted carrying said extension means and transparent window means from the position within said opening to the position inclined to said opening,
 (j) abutment means on said transparent window means, on said extension means and in said channel means permitting relative sliding movement between said transparent window means and said extension means for a first predetermined distance,
 (k) said abutment means on said transparent window means and said extension means coacting after movement thereof through said first predetermined distance to provide for concurrent sliding movement of said transparent window means and said extension means for a second predetermined distance,
 (l) counterbalance means secured to said transparent window means and said bracket means counterbalancing said transparent window throughout its sliding movement, and
 (m) spring latch means on said bracket means and coacting with said transparent window means to positively secure said transparent window means subsequent to movement through said second predetermined distance,
 (n) said transparent window means when latched by said spring latch means permitting unobstructed access to the opening.

7. In a limited access visible records cabinet having record carrying frames pivotally mounted therein and visible through a cabinet opening and wherein operating means, situated outside the opening, are provided to manipulate the frames to make visible a particular set of records, the invention comprising
 (a) a single transparent closure means for said entire opening,
 (b) first closure carrying means pivotally mounted on the cabinet, (c) second closure carrying means mounted for sliding movement on said first closure carrying means, (d) said transparent closure means carried by said first and second closure carrying means for pivotal and sliding movement to a position completely removed from obstructing said opening, (e) interconnecting means carried by said transparent closure means and by said first and said second closure carrying means, (f) said interconnecting means permitting relative sliding movement between said transparent closure means and said second closure carrying means for a first predetermined distance, (g) said interconnecting means providing for concurrent sliding movement of said transparent closure means and said second closure carrying means subsequent to said first predetermined distance and through a second predetermined distance, (h) lock means carried by said transparent closure means and said cabinet and adapted to lock said transparent closure means to said cabinet in the completely closed position of said transparent closure means, and (i) latch means carried by said first closure carrying means and said transparent closure means for latching said transparent closure means against unwarranted motion subsequent to passage of said closure means through said second predetermined distance.

8. The cabinet and closure combination of claim 7, wherein (a) said first closure carrying means comprises bracket means, said bracket means having guide channels mounted thereon, (b) said second closure carrying means comprises an extension means mounted in the guide channels of said bracket means, and (c) said interconnecting means comprises a plurality of abutments on said first closure carrying means, a plurality of abutments on said second closure carrying means and a single abutment on said transparent closure means.

References Cited in the file of this patent

UNITED STATES PATENTS

| | | |
|---|---|---|
| 1,002,757 | Ribau | Sept. 5, 1911 |
| 1,650,880 | Ormsby | Nov. 29, 1927 |
| 2,925,769 | Kubatzky | Feb. 23, 1960 |
| 3,006,268 | Du Bois | Oct. 31, 1961 |